United States Patent [19]
Gallagher

[11] Patent Number: 5,474,132
[45] Date of Patent: Dec. 12, 1995

[54] MARINE RISER

[75] Inventor: William P. Gallagher, Sunnyvale, Calif.

[73] Assignee: Westinghouse Electric Corporation, Pittsburgh, Pa.

[21] Appl. No.: 234,530

[22] Filed: Apr. 28, 1994

[51] Int. Cl.[6] ................................................. E21B 15/02
[52] U.S. Cl. ........................................ 166/367; 405/203
[58] Field of Search .................................. 166/350, 359, 166/367, 369; 405/203

[56] References Cited

U.S. PATENT DOCUMENTS

| | | | |
|---|---|---|---|
| 4,231,436 | 11/1980 | Waller | 175/7 |
| 4,483,399 | 11/1984 | Colgate | 166/308 |
| 4,589,801 | 5/1986 | Salama | 405/224 |
| 4,634,314 | 1/1987 | Pierce | 405/195 |
| 4,728,224 | 3/1988 | Salama et al. | 405/195 |
| 4,745,977 | 5/1988 | Love et al. | 166/369 |
| 4,865,356 | 9/1989 | Moore et al. | 285/55 |
| 5,330,807 | 7/1994 | Williams | 428/34.5 |

*Primary Examiner*—Frank S. Tsay

[57] ABSTRACT

A marine riser section which has an elongated light-weight composite shells is provided with a protective liner of elastomer, epoxy resin or metal. The choice of elastomers includes nitrile rubber, fluorinated rubber or chlorosulfonated polyethylene; the choice of resins includes an aromatic amine cured epoxy with an added styrene curing system; and the metals include steel or titanium alloys or electroless nickel coating.

8 Claims, 6 Drawing Sheets

MARINE RISER

BACKGROUND OF THE INVENTION

1. Field of the Invention

The invention in general relates to the field of offshore oil production, and more particularly to a marine riser with an improved liner.

2. Description of Related Art

A typical marine riser is a cylindrical steel pipe or column which is located vertically between the ocean bottom and a drilling vessel at the surface. The riser system is made up of a plurality of sections or joints connected end to end in a string between the surface and the borehole.

In the drilling of a production well, a drill pipe having a drill bit at its end rotates internally within the riser and carries drilling fluid to the drill bit to lubricate the bit, to remove the cuttings from the borehole and to protect the walls of the hole until cased. The riser provides for the return of the drilling fluids back to the supply on the drilling vessel.

Drilling risers used to date are medium strength steel whose weight provides heavy loadings for the drill platform with the loading increasing as the depth of the ocean increases, eventually reaching a practical limit. Various modifications such as the use of flotation devices have been used to extend this depth with a consequent economic penalty in the drilling operation.

The use of lighter weight materials such as titanium or composites for drilling risers would significantly decrease the deck weight of the riser system, would allow for the storage of a greater number of riser sections and would extend the allowable drilling depths for offshore oil production. One such light-weight riser is described and claimed in U.S. Pat. No. 5,439,323. (W.E. 57,706 filed Jul. 9, 1993, Ser. No. 08/089,724)

Extensive use of light-weight composites for marine risers has not been accomplished because of the susceptibility of these light-weight materials to a reduction in strength due to high temperature, chemical corrosives and abrasive contaminants in the drilling fluid, and the wear produced by the rotating drill pipe coming into contact with the riser.

The present invention provides for a solution so as to enable economic use of light-weight materials such as titanium or composites for marine risers.

SUMMARY OF THE INVENTION

The improved marine riser of the present invention includes a light-weight elongated cylindrical shell having a strength-to-weight ratio greater than steel. A liner is disposed on the inner surface of the shell and is selected from the group consisting of i) an elastomer of nitrile rubber, fluorinated rubber or chlorosulfonated polyethylene; ii) aromatic amine cured epoxy resins with an added styrene curing system; iii) steel or titanium alloys; iv) electroless nickel coating.

Various ones of these coatings maybe reinforced, and various coatings may be provided with particulate matter to provide lubrication to rubbing surfaces and to increase abrasion resistance.

DESCRIPTION OF THE PREFERRED EMBODIMENTS

Figure 1:
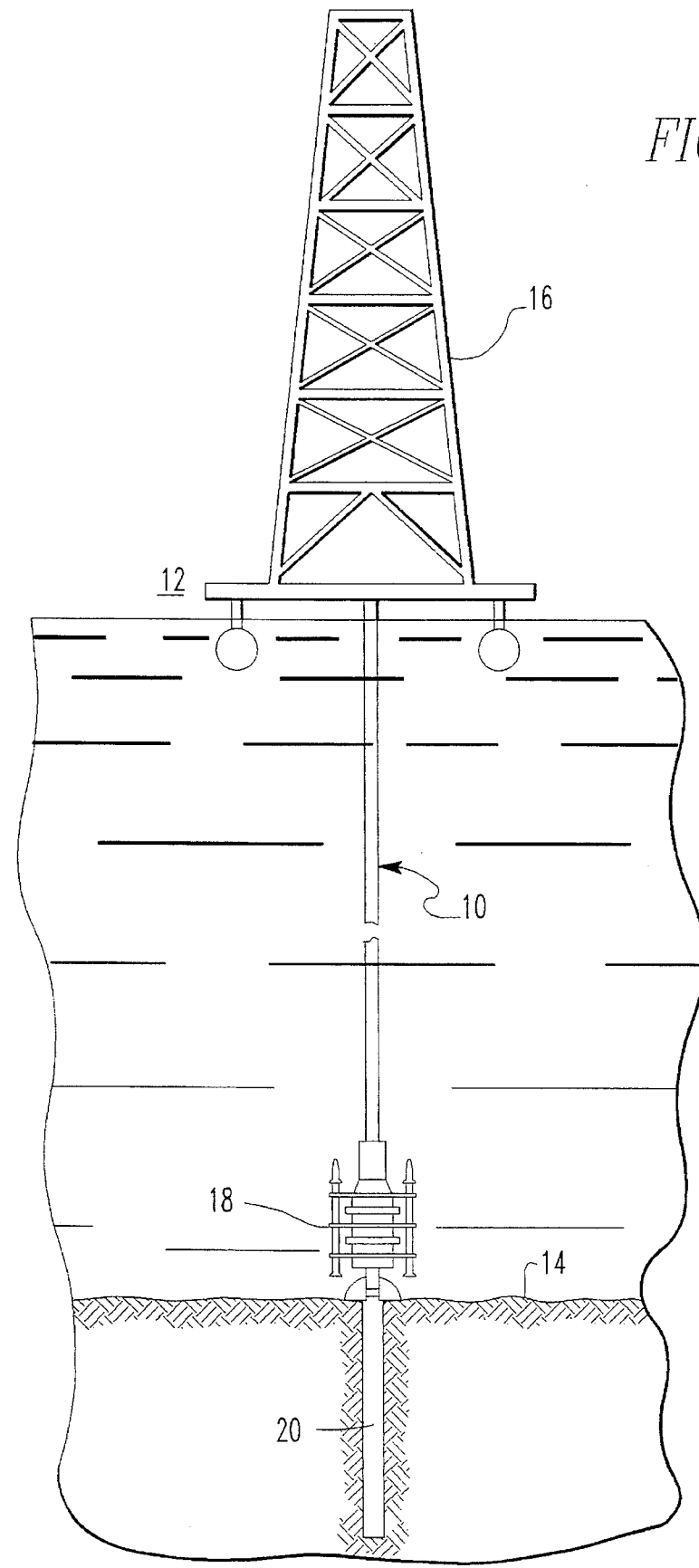
FIG. 1 is an overall diagrammatic elevational view of a drilling platform and riser system.

In the simplified presentation of FIG. 1, a marine riser 10 extends from a floating platform 12 to the bed 14 of a body of water. A derrick 16 carried by floating platform 12 is positioned over the upper end of the riser while the lower end thereof is connected to a blowout preventer 18. Within the riser 10 is a drill string with an attached drilling bit which extends into the borehole 20. This is illustrated in somewhat more detail in FIG. 2.

Figure 2:
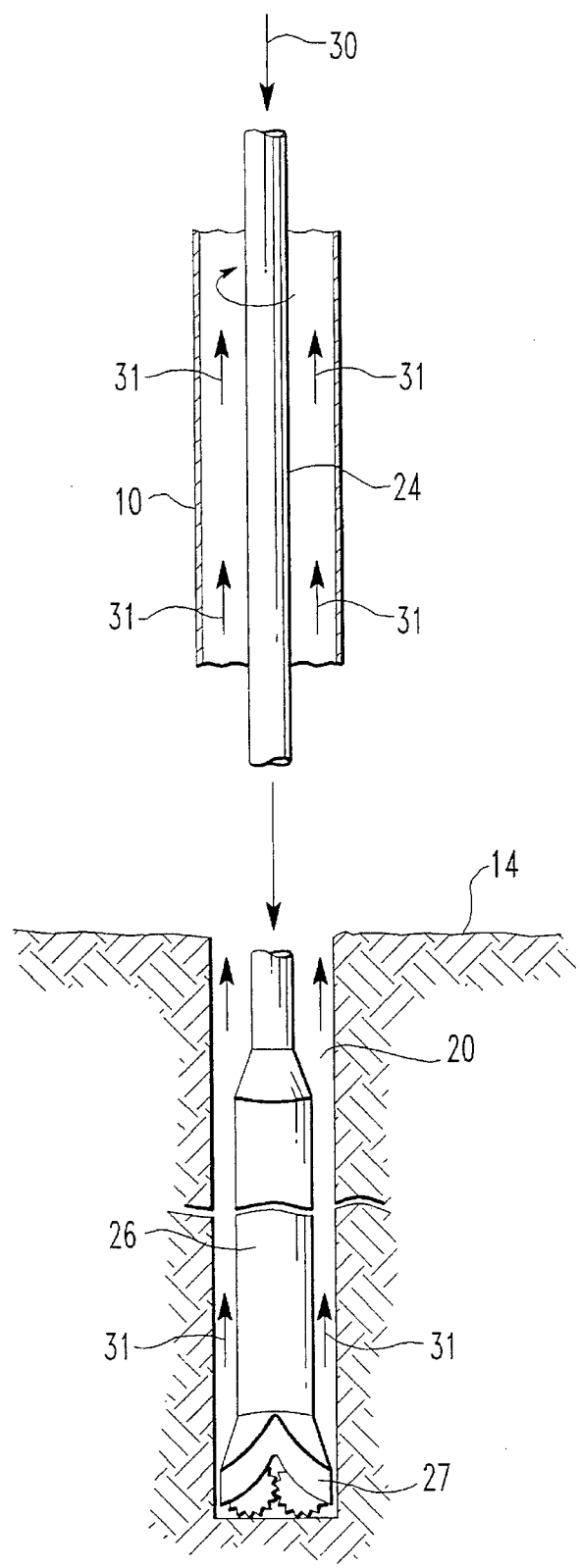
FIG. 2 is a view, partially in section, of a drill string with a drill bit relative to a riser and borehole.

In the cut away view of FIG. 2, drill pipe 24 is illustrated inside of the riser 10. At the lower end of the drill pipe, within the borehole 20, is a drill collar string 26 having at its end the drill bit 27.

During drilling operations, the drill pipe rotates and drilling fluid is supplied to the interior of the drill pipe as indicated by arrow 30. The fluid emerges at the lower end from the drill bit 27 and is returned to the supply, as indicated by arrows 31.

The returning drilling fluid can be very hot and chemically corrosive. If the riser sections are made of a light-weight material such as a light-weight composite, the inside wall thereof must withstand the abrasive and mechanical wear from the drilling fluid and the rotating drill pipe, and must not be weakened by chemical corrosion.

Figure 3:
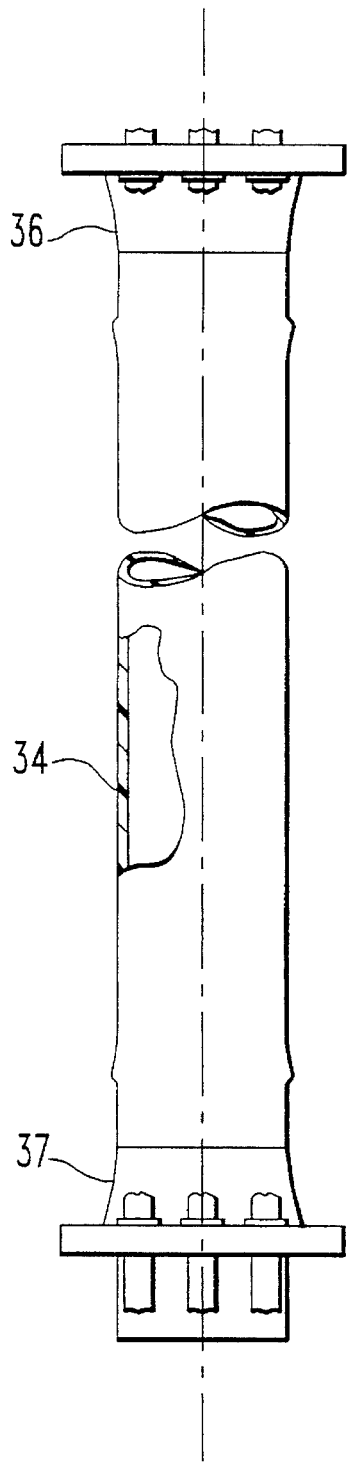
FIG. 3 is a view, with a portion broken away, of a light-weight riser section which may be utilized in the present invention.

A typical light-weight riser section is illustrated in FIG. 3. The riser section includes an elongated cylindrical shell 34 connected to respective end terminations 36 and 37. Cylindrical shell 34 is of a light-weight material having a strength-to-weight ratio greater than steel. Although titanium metal can be used as the shell, the invention will be described herein utilizating a nonmetallic composite material such as described in the previously mentioned patent.

Figure 4A:
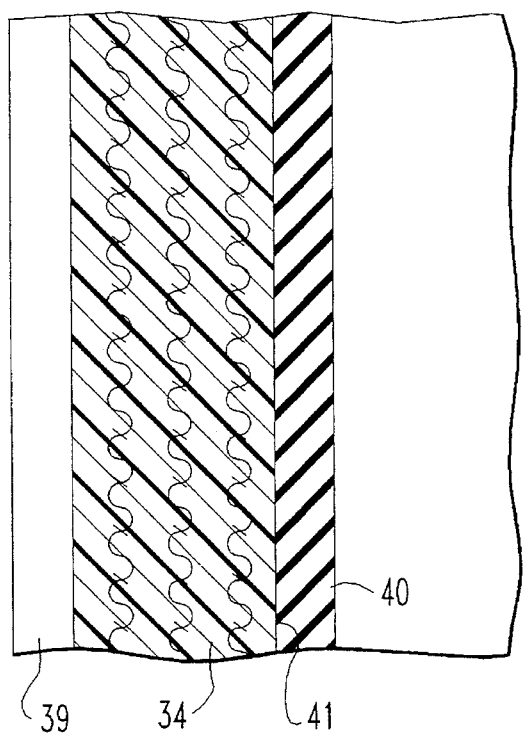
FIGS. 4A–4C are cross sectional views through the riser section wall, illustrating three types of liners of a first embodiment.

In the sectional view of FIG. 4A the shell 34 is a composite layup comprised of a filament wound graphite fiber and a high temperature epoxy resin matrix material so that the shell structure has a strength-to-weight ratio greater than steel and can meet riser loads and environmental conditions.

On the outside of shell 34 there is positioned an outer barrier 39 which can be a foam-graphite-glass arrangement functioning to provide environmental protection and impact damage indications and may include pigments and resins for ultra violet protection of the structure.

A elastomer liner 40 is position on the riser internal surface 41 and is of a nitrile rubber to provide sealing, abrasion resistance, temperature resistance, drilling fluid resistance and thermal insulation to reduce the temperature extreme experienced by the shell 34. Nitrile rubber is a special purpose synthetic rubber that consist of a copolymer of polybutadiene and acrylonitrile. Compositions with higher relative ratios of acrylonitrile, for example 30 to 50 percent, to butadiene have higher resistance to petroleum and other organic fluids and are favored over ordinary rubber linings.

Another liner in this elastomer family which may be utilized is a fluorinated rubber which is a fluorocarbon elastomer comprised of polymers or copolymers of fluorinated and chlorofluorinated hydrocarbons; the resulting elastomer containing approximately 30 to 70 weight percent fluorine.

Another elastomer of choice is chlorosulfonted polyethylene which is a special purpose synthetic rubber produced by reacting polyethylene with chlorine and sulfur dioxide. Although fluoro silicone elastomers can be used, the cost of such material is prohibitive and is not economically feasible. Alternatively, less expensive elastomers such as styrene-butadiene rubber do not meet the corrosion resistance needed for marine riser use.

Figure 4B:
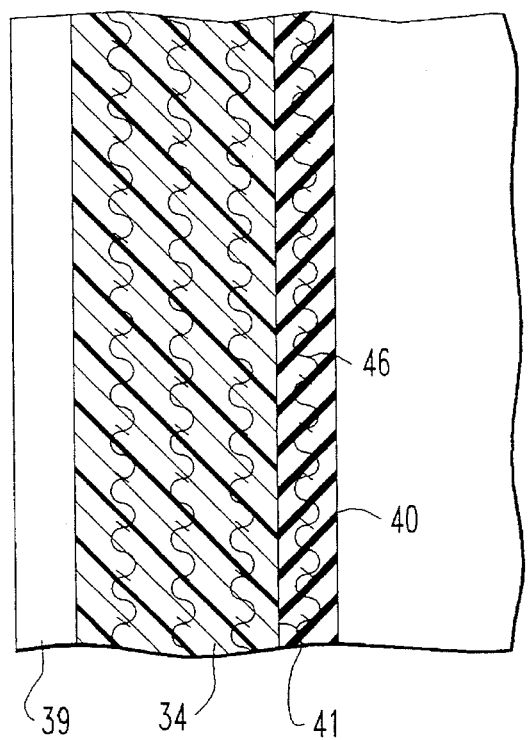
Figure 4C:
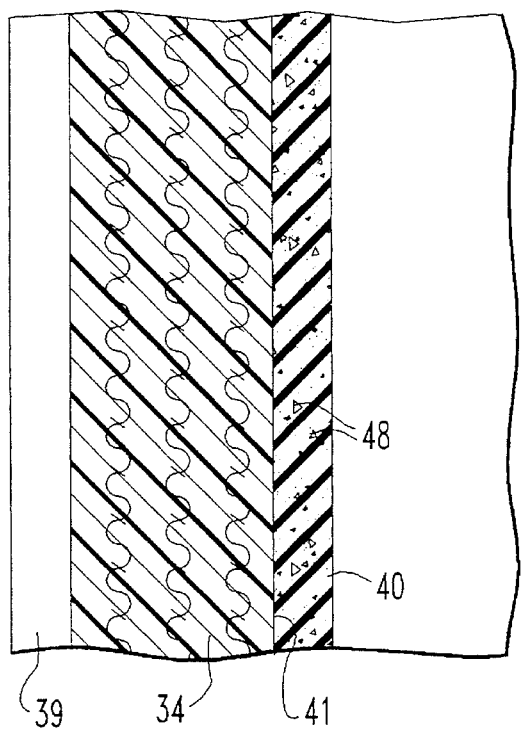

The elastomer liner 40 may be attached to the riser shell 34 by autoclave curing in place or by bonding with epoxy or other adhesives and, as illustrated in FIG. 4B the elastomer liner 40 may contain a reinforcing fabric 46 to increase tear strength and reduce thermal expansion. Further, and as illustrated in FIG. 4C, the elastomer liner 40 may include hard or lubricating particles 48 to increase abrasion resistance.

Figure 5:
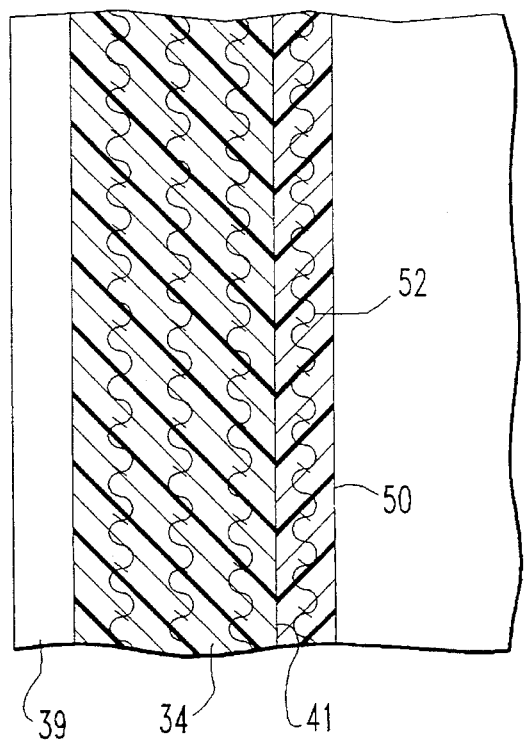
FIG. 5 is a cross sectional view through the riser section wall illustrating another type of liner of a second embodiment.

In another embodiment of the present invention, and as illustrated in FIG. 5, a liner 50 may be provided in the form of high performance epoxy resin. A suitable resin is produced by mixing a two-part system consisting of an epoxy such as bisphenol A epoxy modified with a reactive monomer such as styrene with the other component consisting of an aromatic amine modified with a reactive monomer such as styrene.

The resin preferably contains reinforcing fibers 52 to increase tear strength and may or may not contain hard or lubricating particles to increase abrasion resistance. The liner may be cast inside the shell 34 or it may be prepared by layup on a mandrel with shell 34 being filament or tape wound over the liner. The liner and tube may then be cured separately or together. If reinforcing matting is utilized, the air normally retained in such matting may be detrimental to the properties of the liner and may be substantially eliminated by soaking the matting in warm resin or by vacuum degassing the warm resin while the matting is soaking in it, or by added surfactants to the resin bath or by a combination of these above methods.

Figure 6A:
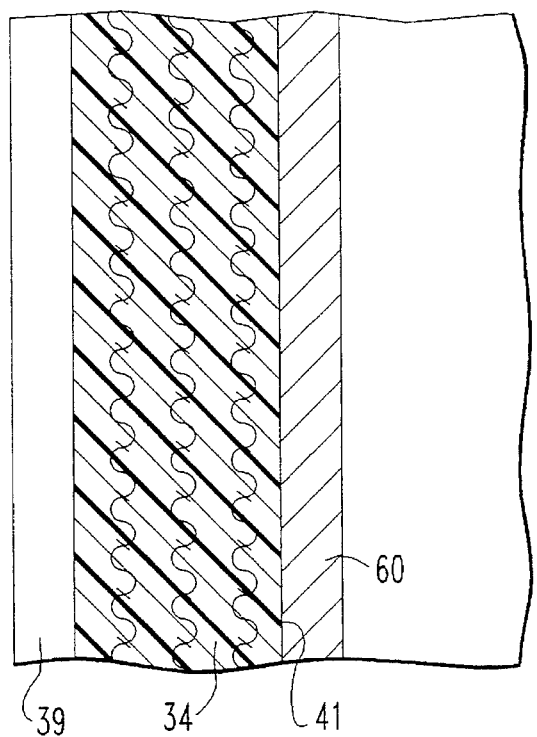
FIGS. 6A and 6B are cross sectional views through a riser section wall illustrating two types of liners of a third embodiment.

Another embodiment of the present invention is illustrated in FIG. 6A which shows a liner 60 of a metallic material. The metal of choice will have yield strength of greater than 60 ksi and may be coated with a plating or a hardfacing to increase its abrasion and corrosion resistance. A low alloy steel having approximately 3 percent alloying elements may be utilized as well as standard alloy steels with more than 3 percent alloying elements. A heat treatment may be utilized to develop maximum usable strength.

Another metal which may utilized is UNS-R58640 titanium which is a heat-treatable alloy of titanium with high strength superior corrosion resistance, and good fabricability.

Figure 6B:
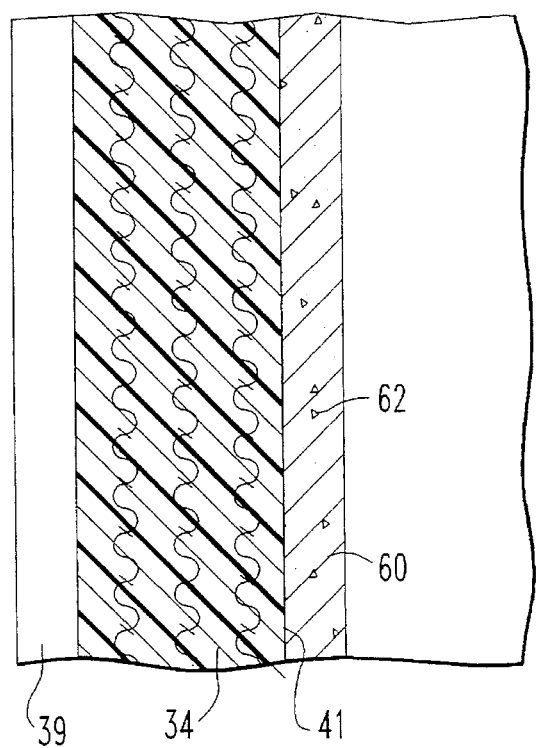

These metallic liners may be installed by placing a welded metal tube on a mandrel with the riser shell being manufactured by filament or tape winding over such liner. Alternatively, the metal tube itself may be used as the mandrel for manufacturing the shell. Liner 60 may also be a deposited metallic liner with the material of choice being electroless nickel which is alloy of nickel that is deposited on the interior of the shell from a bath containing a nickel salt and reducing agent. The bath may contain additives that produce a high strength phosphorus-nickel alloy and may contain particles such as particles 62 in FIG. 6B, which become incorporated into the alloy and provide lubrication to rubbing surfaces and increased abrasion resistance of the alloy.

Accordingly, there is provided a marine riser that allows the use of a variety of light-weight materials for the load-carrying riser body and wherein the body is protected from abrasion and contact with corrosive fluids and is sealed to prevent loss of drilling fluid or intrusion of the surrounding water medium. Further, with the elastomer or epoxy resin liners, the riser is protected from the high temperatures of the drilling fluid utilized in the drilling process.

I claim:
1. An improved marine riser comprising:
   (a) a light-weight elongated cylindrical shell having an inner surface and having a strength-to weight ratio greater than steel;
   (b) a liner on said inner surface of said shell; and
   (c) said liner being selected from the group consisting of
      (i) an elastomer of nitrile rubber, fluorocarbon elastomer or chlorosulfonated polyethylene,
      (ii) aromatic amine cured epoxy resins with an added styrene curing system,
      (iii) steel or titanium alloys, and
      (iv) electroless nickel coating.
2. A marine riser in accordance with claim 1 wherein:
   (a) said liner is selected from group c) i) and includes reinforcing fibers to increase tear strength.
3. A marine riser in accordance with claim 1 wherein:
   (a) said liner is selected from group c) i) and includes particles to increase abrasion resistance.
4. A marine riser in accordance with claim 1 wherein:
   (a) said liner is selected from group c) ii) and includes reinforcing fibers to increase tear strength.
5. A marine riser in accordance with claim 1 wherein:
   (a) said liner is selected from group c) ii) and includes particles to increase abrasion resistance.
6. A marine riser in accordance with claim 1 wherein:
   (a) said liner is selected from group c) iii);
   (b) said shell is a composite layup of a filament wound fiber and a high temperature resin matrix material; and wherein
   (c) said shell is filament wound over said liner.
7. A marine riser in accordance with claim 6 wherein:
   (a) said liner has a surface which includes a surface treatment to increase abrasion and corrosion resistance.
8. A marine riser in accordance with claim 1 wherein:
   (a) said liner is selected from group c) iv);
   (b) said liner is deposited on said inner surface of said shell from a bath containing a nickel salt and reducing agent.

* * * * *